(12) United States Patent  (10) Patent No.: US 8,717,170 B1
Juhasz  (45) Date of Patent: May 6, 2014

(54) MANAGEMENT OF ELECTRIC VEHICLE CHARGING STATION QUEUES

(71) Applicant: EV Connect, Inc., Culver City, CA (US)

(72) Inventor: Bradley Juhasz, Glendale, CA (US)

(73) Assignee: EV Connect, Inc., Culver City, CA (US)

( * ) Notice: Subject to any disclaimer, the term of this patent is extended or adjusted under 35 U.S.C. 154(b) by 60 days.

(21) Appl. No.: 13/670,352

(22) Filed: Nov. 6, 2012

(51) Int. Cl.
*G08B 21/00* (2006.01)
(52) U.S. Cl.
USPC .............. 340/540; 340/4.6; 340/5.2; 320/109
(58) Field of Classification Search
USPC ................ 340/540, 686.1, 4.31, 4.6, 5.1, 5.2, 340/5.21; 705/30, 34; 700/286, 297, 291; 180/60, 651; 713/320; 320/109
See application file for complete search history.

(56) References Cited

U.S. PATENT DOCUMENTS

| 5,926,004 | A  | * | 7/1999 | Henze ........................... 320/109 |
| 8,473,131 | B2 | * | 6/2013 | Leary .............................. 701/22 |
| 2012/0109798 | A1 |  | 5/2012 | Shelton et al. |
| 2012/0197693 | A1 |  | 8/2012 | Karner et al. |
| 2013/0119920 | A1 | * | 5/2013 | Hsu et al. ....................... 320/106 |
| 2013/0138542 | A1 | * | 5/2013 | Sirton ............................ 705/34 |
| 2013/0179383 | A1 | * | 7/2013 | Pringle et al. .................. 706/46 |

* cited by examiner

*Primary Examiner* — Toan N Pham
(74) *Attorney, Agent, or Firm* — SoCal IP Law Group LLP; Jonathan Pearce; Steven C. Sereboff (57) ABSTRACT

There is disclosed method of management of electric vehicle charging station (EVCS) queues and an EVCS queue management system. The method includes limiting access to the EVCS to an individual at the top of an EVCS queue during a changeover time. The changeover time may be predetermined or may be generated based upon data pertaining to the management of the queue and/or to the vehicle of the user at the top of the queue. If the user at the top of the queue fails to activate the EVCS during the changeover time, the next in line in the queue will be given a changeover time in which to reach the EVCS. If the queue is otherwise empty, the user at the top of the queue will be notified that the EVCS is no longer reserved, and that anyone may use the EVCS.

18 Claims, 10 Drawing Sheets

MANAGEMENT OF ELECTRIC VEHICLE CHARGING STATION QUEUES

RELATED APPLICATION INFORMATION

This patent is related to the following co-pending applications:

U.S. patent application Ser. No. 13/693,839 filed Dec. 4, 2012 and entitled "ELECTRIC VEHICLE CHARGING STATION PROVISIONING".

U.S. patent application Ser. No. 13/670,347 filed Nov. 6, 2012 and entitled "QUEUE PRIORITIZATION FOR ELECTRIC VEHICLE CHARGING STATIONS".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the management of electric vehicle charging stations queues.

2. Description of the Related Art

The owners of plug-in electric and hybrid electric vehicles, which will be referred to herein as PEVs, typically have a dedicated charging station at the home or other location where the vehicle is normally garaged. However, without the existence of an infrastructure of public charging station, the applications for PEVs will be limited to commuting and other short-distance travel. In this patent, a charging station is considered "public" if it is accessible and usable by plurality of drivers, as opposed to a private charging station located at a PEV owner's home. A "public" charging station is not necessarily accessible to any and all PEVs. Public charging stations may be disposed, for example at commercial buildings, shopping malls, multi-unit dwellings, governmental facilities and other locations.

In the U.S., charging stations usually comply with the Society of Automotive Engineers (SAE) standard, SAE J1772™. This standard refers to charging stations as "electric vehicle support equipment", leading to the widely used acronym EVSE. However, since the only support actually provided by an EVSE is charging, this patent will use the term electrical vehicle charging station or EVCS.

Typically, EVCS are first-come, first-served. That is, the first user that arrives at an EVCS may use the station and continue to use the EVCS until that user decides to leave. This rewards early arrivals at locations and is typical for normal parking spaces. However, this results in a sub-optimal allocation of the few EVCS typically available in most locations.

For example, a user can leave his or her home fully-charged and arrive at a destination with nearly-full batteries. The user may then park at an EVCS and begin charging his or her electric vehicle. The electric vehicle is fully charged within one to three hours, but the user's car may remain in the spot for the remainder of the day. Meanwhile, other individuals with electric vehicles who arrived later or with lower battery charge levels are unable to access the EVCS.

DESCRIPTION OF THE DRAWINGS

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
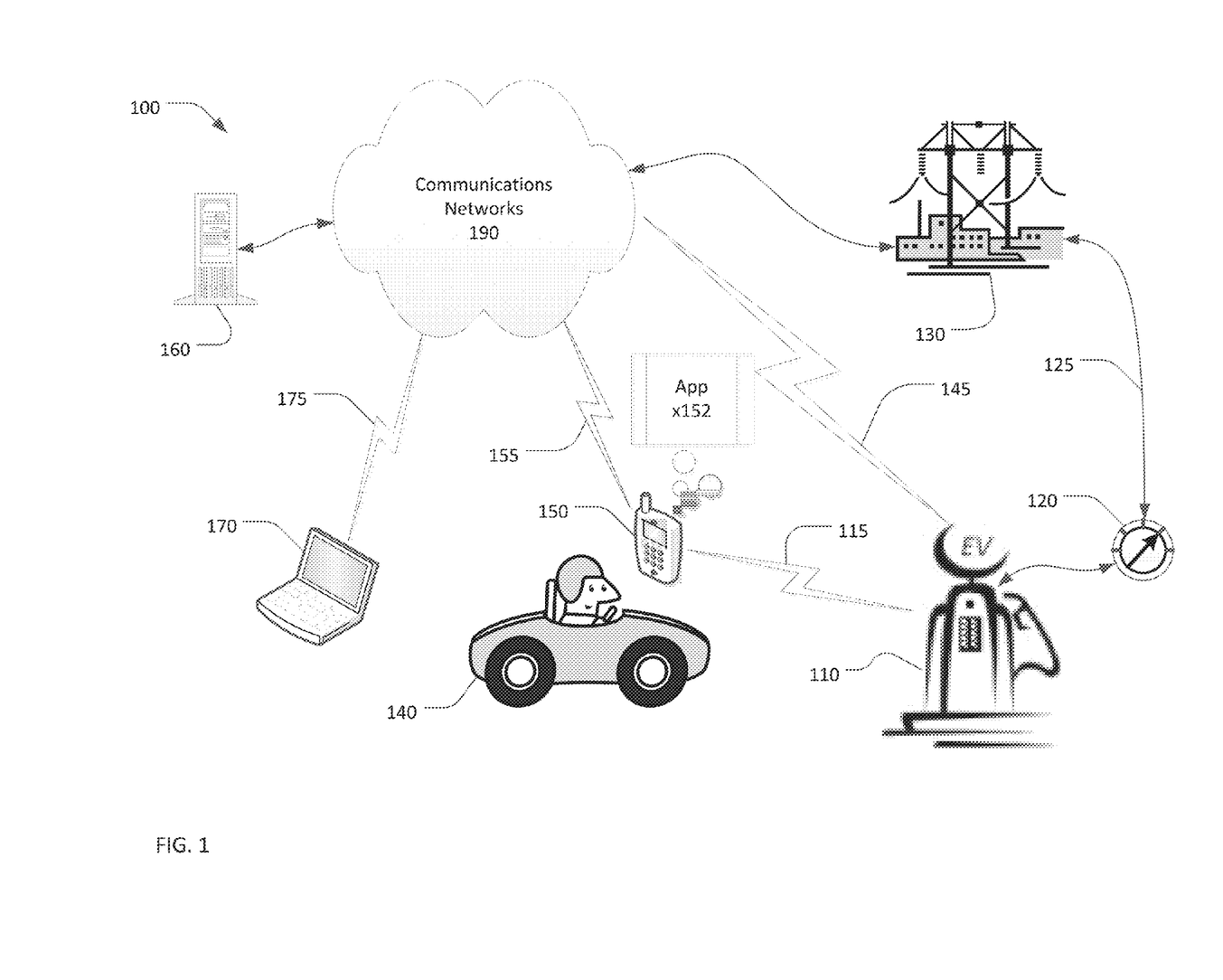
FIG. 1 is a block diagram of an environment for charging an electric vehicle.

Referring now to FIG. 1, an environment 100 for charging an electric vehicle 140 may include an EVCS 110 connected to a utility grid 130 via a meter 120. The EVCS may communicate with a driver's personal communications device (PCD) 150 over a first wireless communications path 115. The PCD may, in turn, connect to a network 190 over a second wireless communication path 155. The first wireless communications path 115 may use, for example, Bluetooth™, ZigBee™, or some other short-range wireless communications protocol. The second communications path 155 may use, for example, WiFi™ or a cell phone data communications protocol to connect to the network 190. The PCD 150 may be, for example, a smart phone, a tablet computer, a laptop computer, a computer operating as a part of the PEV or some other device capable of communicating with the EVCS 110 and the network 190.

The PCD 150 may run or access an application, or "app", 152 that enables the PCD to serve as a user interface for the EVCS 110. This app 152 may be web-based or compiled for use on the PCD. The EVCS 110 and the network 190 may communicate using a third communications path 145. This third communications path 145 may be wireless, as described above, or wired. If the third communications path 145 is wired, it may rely upon proprietary protocols or protocols based upon the OSI model. In some situations, the PCD 150 running the app 152 may also function as a bridge to provide bidirectional communications between the EVCS 110 and the network 190.

A server 160 may manage a network of vehicle charging stations including the EVCS 110. The server 160 may monitor the operation of the EVCS 110. The server 160 may manage billing and/or cost allocation for the use of the EVCS 110. The server 160 may manage an authorization system to limit access to the EVCS 110 to only authorized vehicles or drivers. The server 160 may also manage a reservation or queue system to allow authorized drivers to reserve future use of the EVCS 110. The server 160 may communicate with the EVCS 110 via the network and the third communications path 145. The server 160 may communicate with the EVCS 110 via the network and the PCD 150. In this case, communications between the server 160 and the EVCS 110 may be intermittent and only occur when a PCD 150 running the app 152 is present.

A driver may communicate with the server 160 using their PCD 150 or using another computing device such as a personal computer 170 coupled to the network 190 by a wired or wireless communications path 175. The driver may communicate with the server 160, for example, to establish an account, to provide billing information, to make a reservation, or for some other purpose.

The meter 120 may be a conventional electric utility meter or a so-called "smart meter" that communicates with the utility grid 130 and the EVCS 110. The EVCS 110 may communicate with a smart meter 120, when present, using the same wireless protocol used to communicate with the PCD 150 or a different wireless communications protocol. The EVCS may communicate with the smart meter 120 using a power line communications (PLC) protocol such as, for example, the IEEE 1901 protocol.

Figure 2:
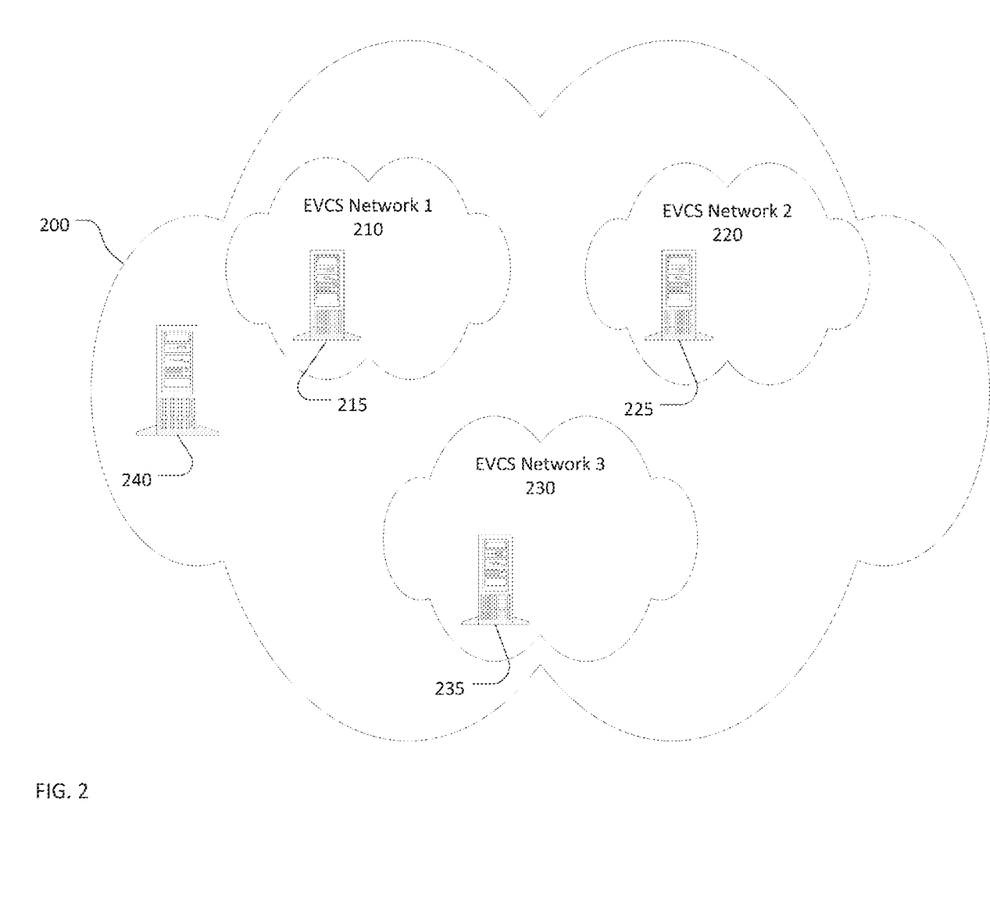
FIG. 2 is a block diagram of an electric vehicle charging station (EVCS) cloud.

Referring now to FIG. 2, a cloud 200 may support a plurality of EVCS management networks, each of with may operate, for example, as a virtual private network within the cloud 200. Three EVCS management networks 210, 220, 230 are shown in this example. A network may contain more or fewer than three EVCS management networks. Each of the EVCS management networks may be owned or operated by different business entities such as, for example, electric utility companies and manufacturers of EVCS equipment. The cloud 200 may include a physical or virtual server 240 to manage interactions between the EVCS management networks 210, 220, 230.

Each EVCS management network 210, 220 and 230 may include one or more EVCS operating at respective locations. Each EVCS management network 210, 220, 230 may include a respective server 215, 225, 235 to manage access, billing, and queuing for the one or more EVCS within the network.

The server 240 may communicate with each of the EVCS management networks 210, 220 and 230. The server 240 may manage transactions between the EVCS management networks 210, 220, and 230. For example, a customer or member of EVCS management network 1 210 may be at a location remote from any EVCS in EVCS management network 1, and may need to access an EVCS within another EVCS management network. The customer may communicate with server 215 with in EVCS management network 1 210 to request access to an "out of network" EVCS. The servers 215 may then communicate with server 225 and/or server 235 via server 240 to gain customer access to an EVCS within EVCS management network 2 220 or EVCS management network 3 230. Billing and payments for access to the out-of-network EVCS may be processed via the server 240.

Figure 3:
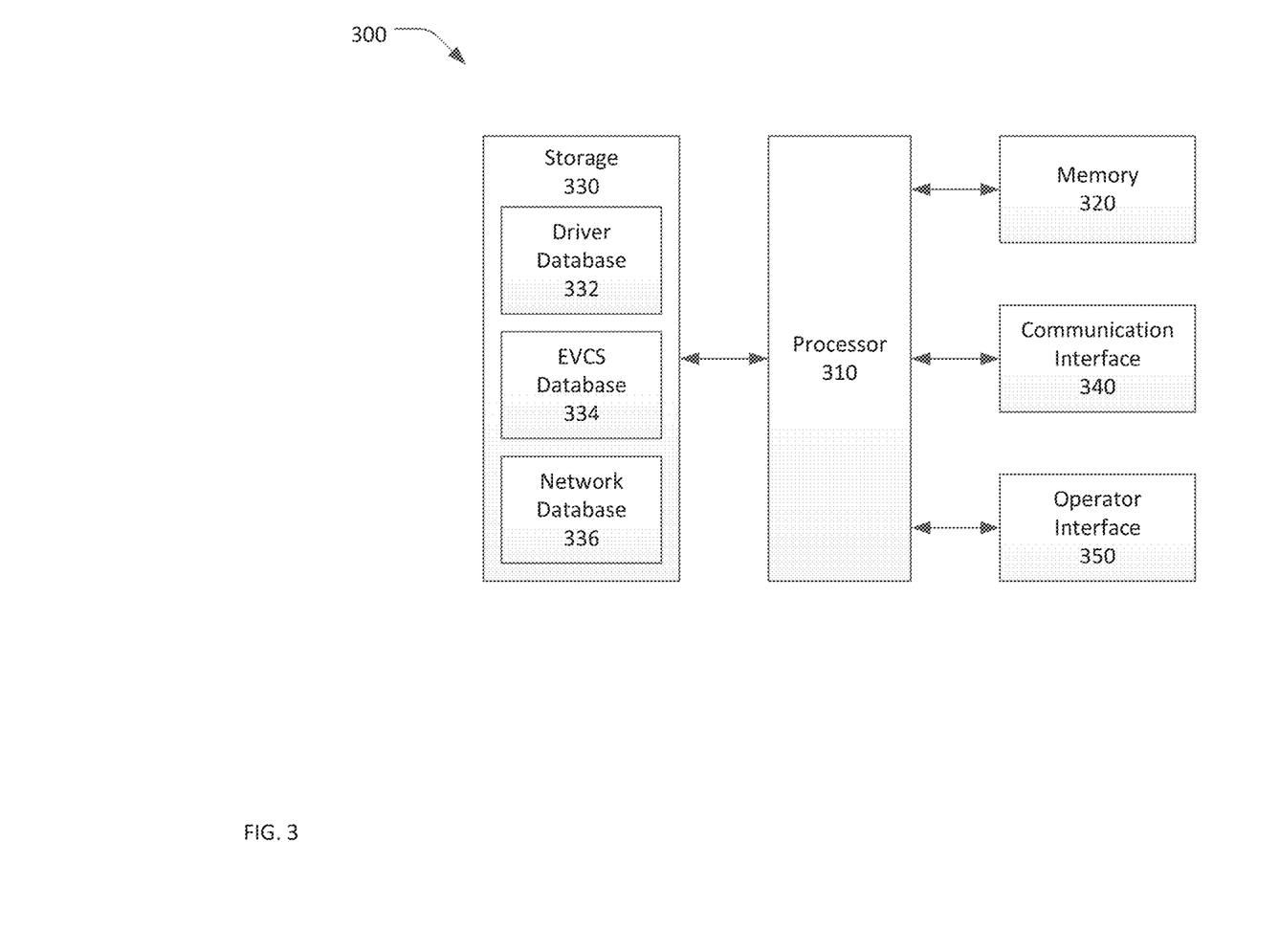
FIG. 3 is a block diagram of a computing device.

Turning now to FIG. 3, a block diagram of a computing device 300 is shown. The computing device 300 may be, for example, the server 160 of FIG. 1 or the servers 215, 225, 235 or 240 of FIG. 2. The computing device 300 includes a processor 310, memory 320, storage 330, a communication interface 340 and an operator interface 350. The storage 330 includes a driver database 332, an EVCS database 334 and a network database 336.

The processor 310 may include hardware, which may be augmented by firmware, for providing functionality and features described herein. The processor 310 may include one or more processor circuits such as microprocessors, digital signal processors, and graphic processors. The processor 310 may include other circuits such as logic arrays, analog circuits, and/or digital circuits.

The memory 320 may include static or dynamic random access memory, read-only memory, and/or nonvolatile memory such as flash memory. Information stored in the memory may includes a BIOS (basic input/output system) to initialize the processor 310, interim and final test data, and other data relating to ongoing operation of the processor 310.

The storage 330 may include one or more storage devices. As used herein, a "storage device" is a device that allows for reading and/or writing to a storage medium. These storage media include, for example, magnetic media such as hard disks, optical media such as compact disks (CD-ROM and CD-RW) and digital versatile disks (DVD and DVD±RW); flash memory devices; and other storage media. As used herein, the term "storage media" means a physical object for storing information. The term storage media does not encompass transitory media such as signals and waveforms.

Information stored in the storage 330 may include a driver database 332. The driver database 332 may contain information pertaining to drivers (or operators) of PEV that may access the computing device 300. The driver database 332 may include information, for each driver, such as a user name or other unique identification, an associated password, address information, billing information, a driver's real name, a driver's email address, a driver's mobile telephone number and a preferred method of contact. Additional or less information pertaining to a driver may be maintained by the driver database 332. For example, a driver's employment, VIP or group membership status may also be stored in the driver database 332.

The storage 330 may include an EVCS database 334. The EVCS database 334 may contain information pertaining to each of the EVCS that are serviced by the computing device 300. For example, in FIG. 2, each server 215, 225, 235 managed one or more EVCS within a respective EVCS management network 210, 220, 230. The EVCS database 334 may store information pertaining to the network address (if any) of each EVCS under its service, the capabilities of each EVCS, the current and projected use of each EVCS, any queue of users wishing to access each EVCS (in some cases a group of EVCS may be managed under a single queue, for example, at a location including multiple EVCS), the driver currently using each EVCS and any other information pertaining to each EVCS.

The storage 330 may include a network database 336 in addition to or instead of the driver database 332 and/or the EVCS database 334. The network database 336 may include data pertaining to communicating and managing transactions with one or more EVCS networks. The network database 336 may maintain authentication or other information necessary to enable this access. For example, the server 240 in FIG. 2 may include a network database containing information necessary to manage transactions between the EVCS management networks 210, 220, 230. The server 240 may not contain a driver database and/or an EVCS database since the server 240 may rely upon the servers 215, 225, and 235 within the respective EVCS networks to store driver and EVCS information.

Information stored in the storage 330 may also include program instructions for execution by the processor 310. The program instructions may be in the form of an application program, an applet (e.g., a Java applet), a browser plug-in, a COM object, a dynamic linked library (DLL), a script, or one or more subroutines. The program instructions may include an operating system such as, for example, variations of the Linux, Microsoft Windows®, Symbian®, Android®, and Apple® operating systems.

The communication interface 340 may include specialized circuits required to interface the computing device 300 with, for example, a network such as network 190 in FIG. 1, a PCD or a PEV. The communication interface 340 may include interfaces to one or more wired or wireless networks. The communication interface 340 may include, for example, one or more of an Ethernet™ interface for connection to a wired network, a Blue Tooth™ transceiver, a Zigbee™ transceiver, a WiFi™ transceiver, and/or a transceiver for some other wireless communications protocol. The communication interface 340 may be used to communicate information to and/or to receive information from a PCD or with a PEV that is or will be using an EVCS.

The operator interface 350 is used for an operator of the computing device 300 to interact with and to operate the computing device 300. The operator interface 350 may include a color or black-and-white flat panel display, such as a liquid crystal display, and one or more data entry devices such as a touch panel, a keyboard, and/or a mouse or other pointing device.

Figure 4:
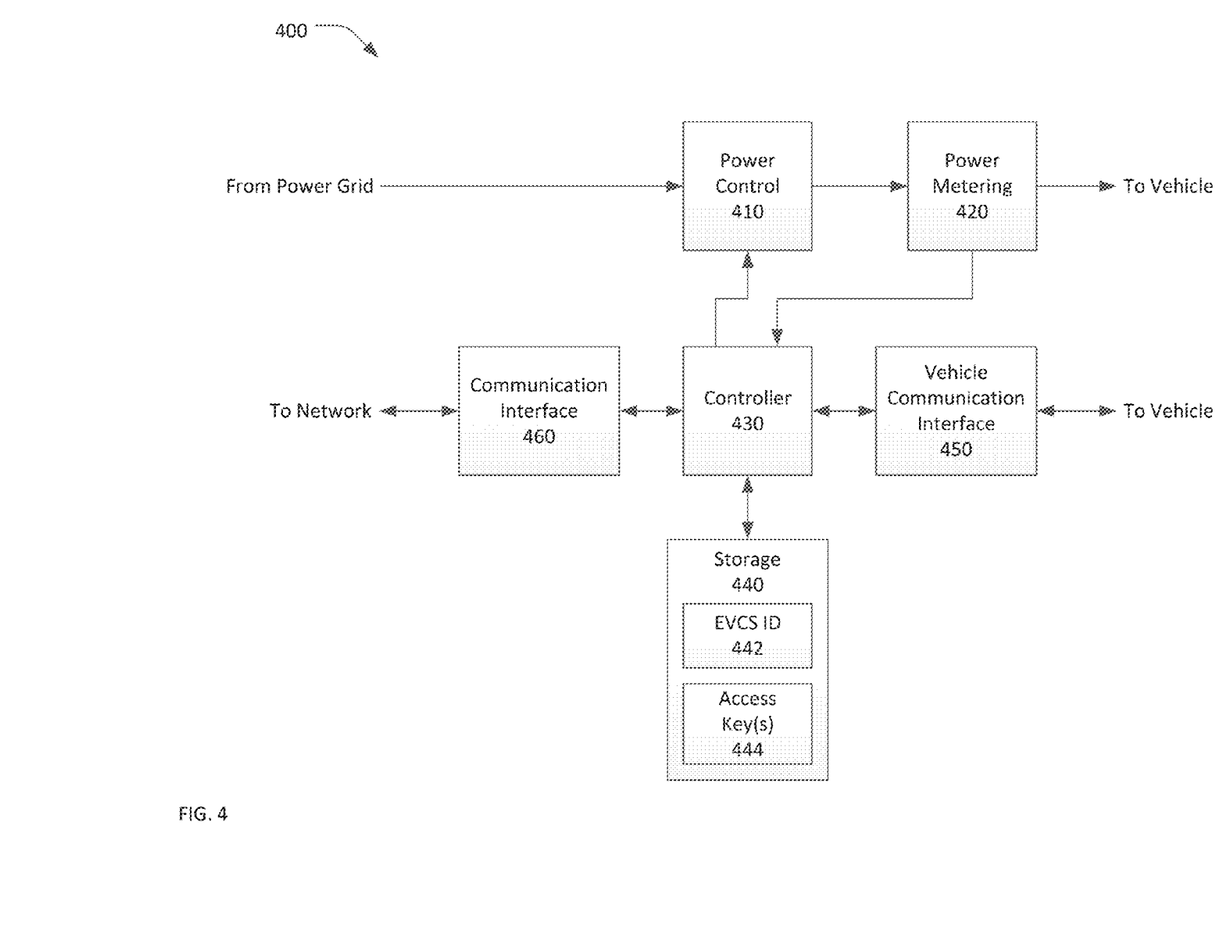
FIG. 4 is a block diagram of an EVCS.

Referring now to FIG. 4, a block diagram of an EVCS 400 is shown. The EVCS may include power control 410, power metering 420, a controller 430, storage 440, a vehicle communication interface 450, and a communication interface 460. The storage 440 may store data including an EVCS ID 442 and access key(s) 444.

The power control 410 handles the receipt of power from the power grid by the EVCS 400. The power control 410 is instructed by the controller 430 to direct power through the power metering 420 to a vehicle being charged by the EVCS 400. The power control 410 may be, for example, a relay or solid-state switch to either turn on or turn off the charging power to the vehicle in response to an instruction from the controller 430. The power metering 420 measures the current passing through the power control and accumulates the total charge or energy delivered from the EVCS 400 to the vehicle. This power metering 420 may be used in determining the appropriate cost to the operator of the vehicle.

The controller 430, which may be a computing device including one or more processors and memory, may communicate with vehicles, such as a PEV, using the vehicle communication interface 450. The vehicle communication interface 450 may, for example, provide a pilot line signal to the PEV in accordance with SAE J1772™. The vehicle communication interface 450 may communicate with vehicles in some other manner such as power line communications or wirelessly. Through the vehicle communication interface 450, the controller 430 of the EVCS may receive information from the vehicle indicating the current charge state of a PEV, the rate at which that charge state is changing for a PEV and, as a result, be able to estimate a time-to-full charge state. The communication interface 460 may be used to communicate with the network and, by extension, with an EVCS server, such as the servers 215, 225, 235, in an EVCS network that includes the EVCS 400. The communication interface 460 may communicate with the network by way of a wired connection, such as an Ethernet connection. The communication interface 460 may communicate with the network by a wireless connection such as a WireFi™ local area network or a cellular telephone connection. The communication interface may communicate with the network directly or indirectly by way of a wireless connection to a driver's smart phone or other personal communication device.

The controller 430 may use the communication interface 460 to obtain data pertaining to drivers of PEVs, to obtain access to a queue of potential EVCS users, to transmit data pertaining to use of the EVCS by particular drivers and/or PEVs, and/or to communicate driver and billing information. For example, the EVCS may communicate to an EVCS server that the EVCS is no longer in use by the most recent driver. As a result, the EVCS server may respond with data pertaining to the next driver in the queue and to instruct the EVCS to limit access to only that next driver for a changeover period. The EVCS 400 may then use the communication interface 460 to notify the next driver, such as through simple message service or email, that the EVCS 400 is available for his or her use. Alternatively, the EVCS server may send such a notification in response to the EVCS communicating that the EVCS 400 is no longer in use.

The EVCS 400 also includes storage 440. The storage 440 provides nonvolatile storage of program instructions and data for use by the controller 430. Data stored in the storage 440 may include an EVCS ID 442 and one or more access key(s) 444. The EVCS ID 442 may be a unique identifier that is used to uniquely identify each EVCS in an EVCS network. The EVCS ID 442 may be, for example, a serial number, a MAC address, some other similar unique identifier, or a combination of two or more identifiers. The EVCS ID 442 may be derived by encrypting a serial number, a MAC address, some other unique identifier, or a combination of two or more identifiers. The EVCS ID 442 may be a random number or other identifier assigned by a remote device such as a server that manages an EVCS network containing the EVCS 400. The controller 430 may use the EVCS ID to uniquely identify the EVCS 400 to the network and/or PEVs using the communication interface 460 and the vehicle communication interface 450, respectively.

The access keys 444 may include one or more keys that allow a driver to charge a PEV at the EVCS 400. In order to charge a PEV, the driver must provide the EVCS 400 with an access key that matches one of the stored access keys 444. The access keys 444 may include, for example, an access key that allows unlimited use of the EVCS for charging and one or more restricted access keys that allow restricted use of the EVCS. A restrict use access key may be limited to, for example, a specific time window, a particular time of day, or one-time only use. A driver may present an access key to the EVCS 400, for example, by entering the access key using a keypad or other data entry device, or by communicating the access key wirelessly from a PCD.

The access key(s) 444 may also include one or more keys used by an administrator or maintenance personnel to, either remotely or directly at the EVCS 400, access maintenance and administrative features for the EVCS 400. For example, an administrator may be required to input an access key 444 in order to access administrator functions for the EVCS 400. In addition, the storage 440 may store software suitable to perform the various functions of the EVCS 400 described herein. The storage 440 may also store data pertaining to usage of various PEVs and associated users such that billing may be properly reported to, for example, an EVCS server. The storage 440 may also store a periodically updated queue of users waiting to gain access to the EVCS.

Figure 5:
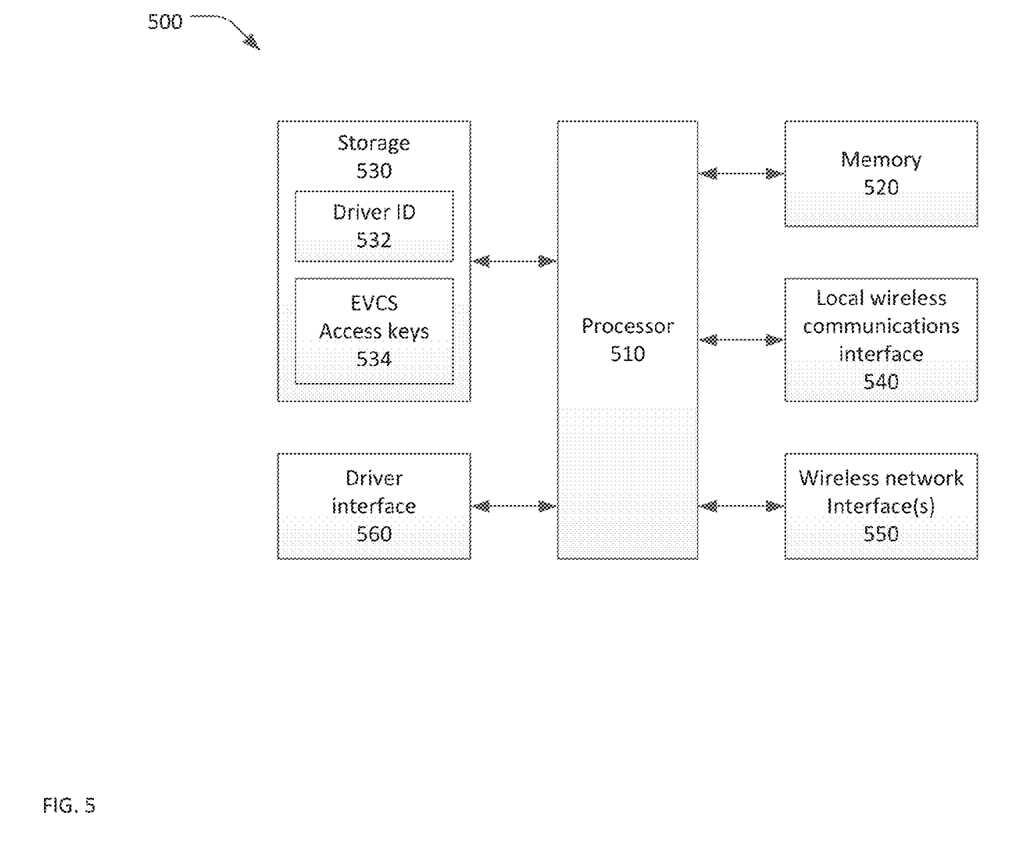
FIG. 5 is a block diagram of a personal computing/communications device.

FIG. 5 shows a block diagram of a personal computing/communications device 500 (a "PCD"). The PCD 500 includes a processor 510, memory 520, storage 530, local wireless communications interface 540, wireless network interface(s) 550 and a driver interface 560. The driver interface 560 may be, for example, a touch screen display or some other combination of a display and a data input device such as a keypad and/or a pointing device.

The local wireless communications interface 540 may be, for example, a Bluetooth™, Zigbee™ or wireless local area network interface that can connect within a short distance of the PCD 500. This local wireless communications interface 540 may be used, for example, to connect to an EVCS, such as the EVCS 400, in order to exchange data pertaining to the EVCS.

The wireless network interface(s) 550 may be one or more interface usable to send and receive data over a long-range wireless communication network. This wireless network may be, for example, a mobile telephone network with data capabilities and/or a WiFi™ local area network or other wireless local area network.

The processor 510 and memory 520 serve substantially similar functions to the processor 310 and memory 320 in FIG. 3. The storage 530 may serve substantially similar functions to the storage 330 in FIG. 3. The storage 530 may store a driver ID 532, one or more EVCS access keys 534, and an electric vehicle charging application (EVC App) 536.

The driver ID 532 may be, for example, provided by an EVCS server or related web-based software. The driver ID 532 uniquely identifies the operator of the PCD 500 to an EVCS. The driver ID 532, therefore, may be used to enable EVCS charging to an intended operator of the PCD 500 and may enable billing for EVCS services to the correct individual. The driver ID 532 may be transmitted to an EVCS (to be forwarded on by the EVCS to an EVCS server) using the wireless network interface(s) 550.

The EVCS access keys 534 may enable a driver in possession of the PCD 500 to access an EVCS such as the EVCS 400 in order to charge a PEV. Upon receiving a request to charge a PEV, the EVCS may require the driver to submit both a driver ID and an Access Key, and may provide the charging service only if the submitted access key matches an access key stored within the EVCS.

When executed, the EVC App 536 may cause the PCD 500 to serve as an interface between the driver and the EVCS. For example, the EVC App may cause a graphical user interface (GUI) for the EVCS to be presented on the driver interface 560. The driver may then use the GUI to request charging services from the EVCS. The EVC App 536 may also cause the PCD to provide the charging service request, the driver ID 532 and an EVCS access key to the EVCS using either the local wireless communications interface 540 or a wireless network interface 550.

Description of Processes

Figure 6:
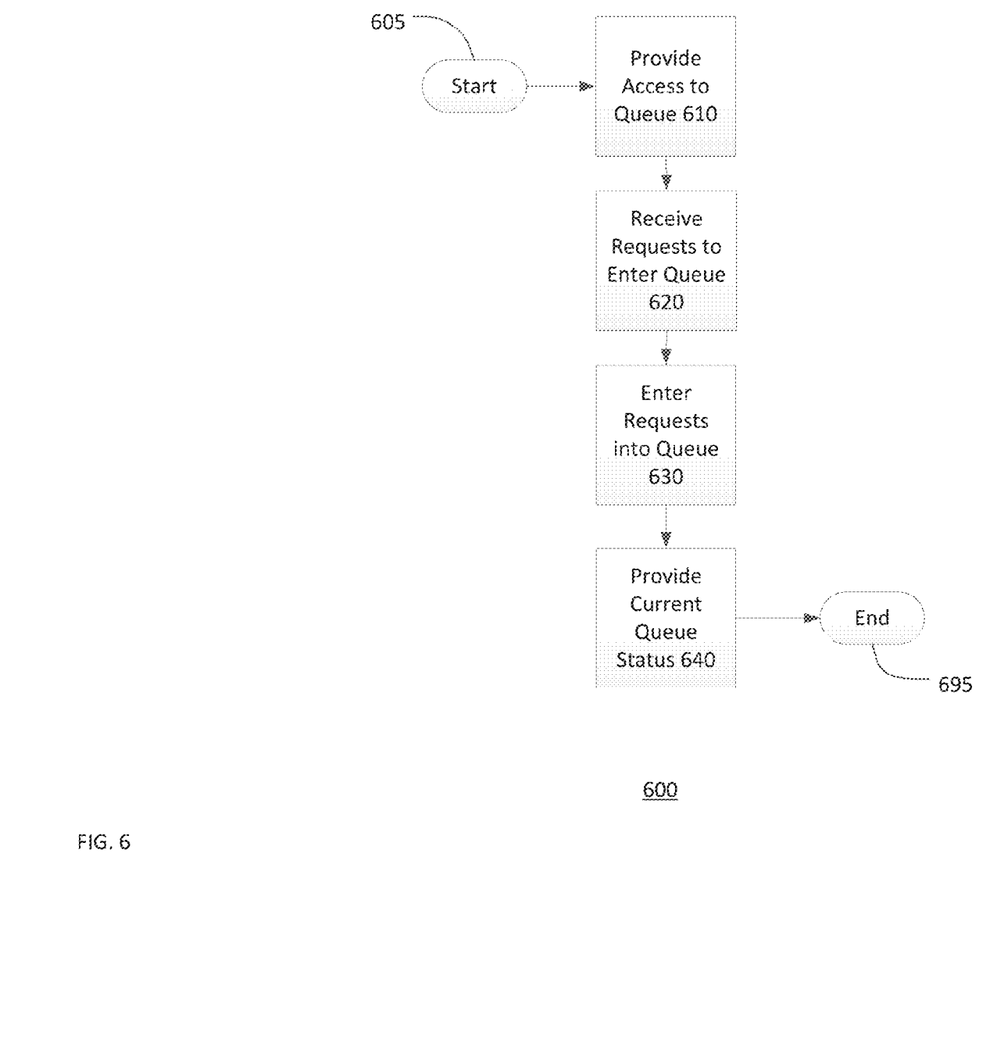
FIG. 6 is a flowchart of the process of entering the electric vehicle charging station queue.

Referring now to FIG. 6, a flowchart 600 of the process of entering the electric vehicle charging station (the "EVCS") queue is shown. The flow chart 600 has both a start 605 and an end 695, but the process may be cyclical in nature. Many instances of the process may be taking place serially or in parallel.

First, an EVCS server, such as server 160 or server 240, provides access to a queue at 610. Interactions with the ECVS server, such as this access may be provided through a web-based application, through a mobile smartphone application, through a telephonic guided interaction with an automated system, using the electric vehicle charging station itself, through an interactive system in an electric vehicle or through other, similar devices. Through the interaction, a driver (or "vehicle operator" or "user") interacting with the EVCS server may be able to review the current status of the queue, for example, to obtain an estimate of the time that the EVCS could be available for use by his or her PEV. The terms "vehicle operator," "driver" and "user" refer to the operator of or someone acting on behalf of the operator of a particular PEV that may be charged using the EVCS.

The PCD may also provide information or the capability to perform additional actions. For example, a user may be given an option to pay a premium for a higher placement in the queue and thus earlier access to the EVCS. The access to the queue may include access to information regarding the current state of the queue or the EVCS—for example, the number of others in the queue, the capabilities of the EVCS or other, related information.

Next, the ECVS server receives a request from the driver to enter the queue at 620. The request may incorporate information pertaining to the vehicle or to the user. This information may be automatically obtained, associated with a pre-existent account or an account created during the request process and may include data derived from a mobile device associated with the vehicle or driver. For example, the information may include the current location and/or current charge of a vehicle. The information may also include a unique identification associated with the driver that may indicate that the driver is associated with a particular group, is an employee of a particular company or entity, that the driver has pre-paid or is willing to pay a premium for greater access to this or a group of ECVS. This information may be used by the ECVS server to prioritize the queue.

The ECVS server then enters the requests into the queue at 630. Specifically, user identification associated with the vehicle and/or associated user is entered into the ECVS queue. The user identification may be entered at the end of the queue.

Finally, the ECVS server may provide the current status of the queue 640 to the driver. This status may be provided via the access device and may provide a full listing of the queue or may simply provide a position in the queue or an estimated time at which the driver's vehicle may gain access to the ECVS.

Figure 7:
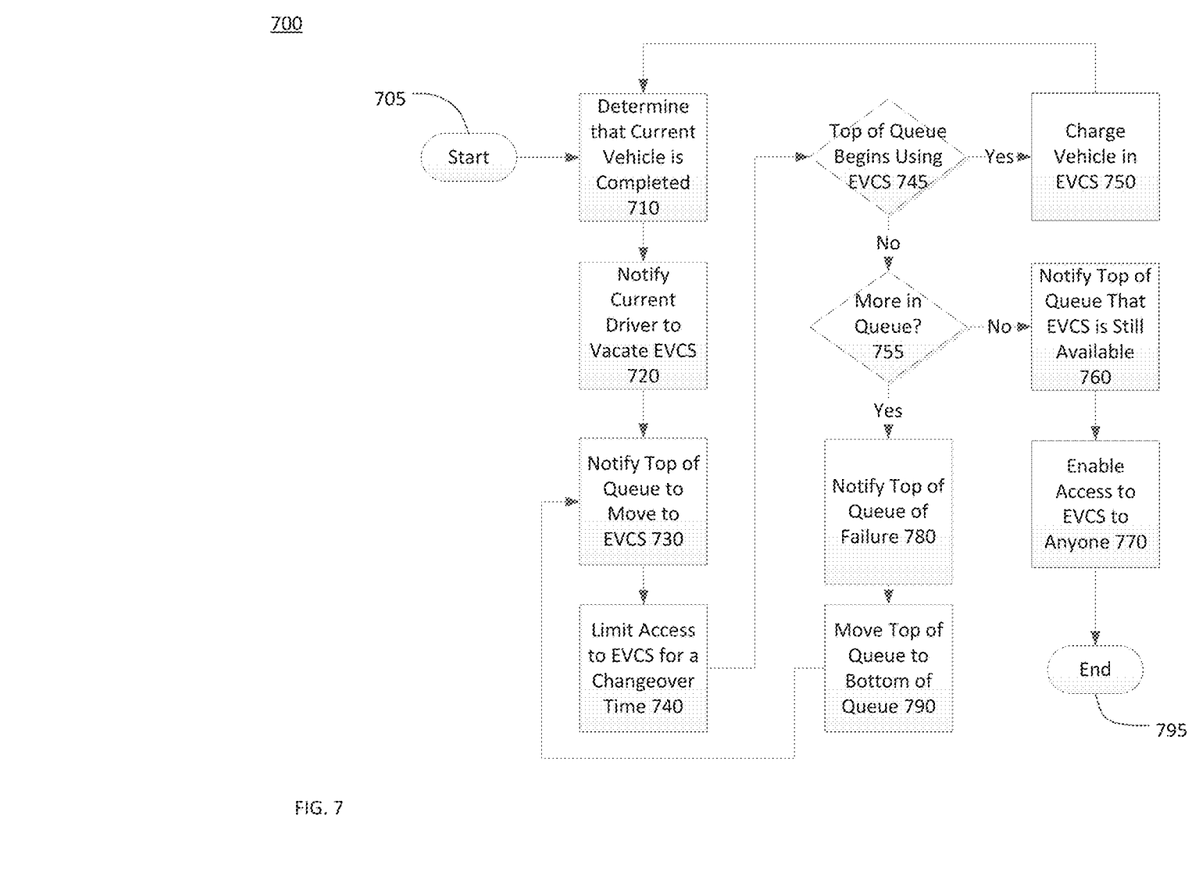
FIG. 7 is a flowchart of queue management for the electric vehicle charging station queue.

Turning now to FIG. 7, a flowchart 700 of queue management for the electric vehicle charging station (the "EVCS") queue is shown. The flow chart 700 has both a start 705 and an end 795, but the process may be cyclical in nature. Many instances of the process may be taking place serially or in parallel.

First, the EVCS or an EVCS server determines that the current vehicle is completed at 710. This completion may be a determination that the vehicle is fully-charged. Alternatively, this determination may be based upon a pre-determined time allocation for the vehicle that is now complete. Still further alternatively, this determination may be that a more important individual, an individual willing to pre-pay, an employee or other priority electric vehicle operator now wishes to utilize the EVCS. In such a case, the current vehicle may be deemed "completed" in order to make way for the next EVCS user.

Figure 9A:
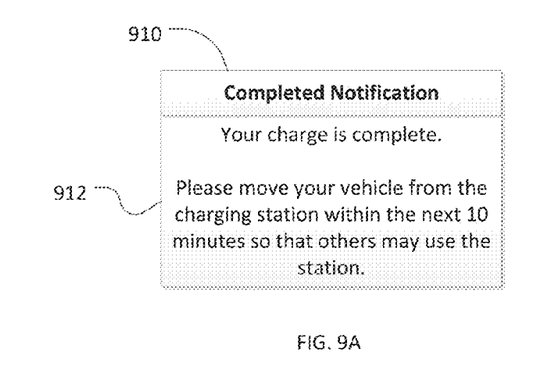
FIGS. 9A and 9B are examples of completion notifications.
Figure 9B:
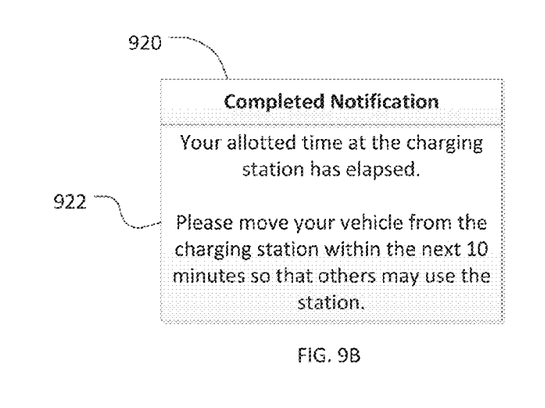

Once the current vehicle s completed at 710, the EVCS or EVCS server notifies the driver that he or she should vacate the EVCS at 720. Typically, a time frame during which the driver must vacate the EVCS is given to the driver by the EVCS or the EVCS server. This time frame may be pre-determined or may be based upon parameters related to the driver, such as the driver's location or the driver's schedule. Examples of these notifications 910, 920 and their associated driver information 912, 922 may be seen in FIGS. 9A and 9B.

Figures 10, 10A, 10B, 10C:
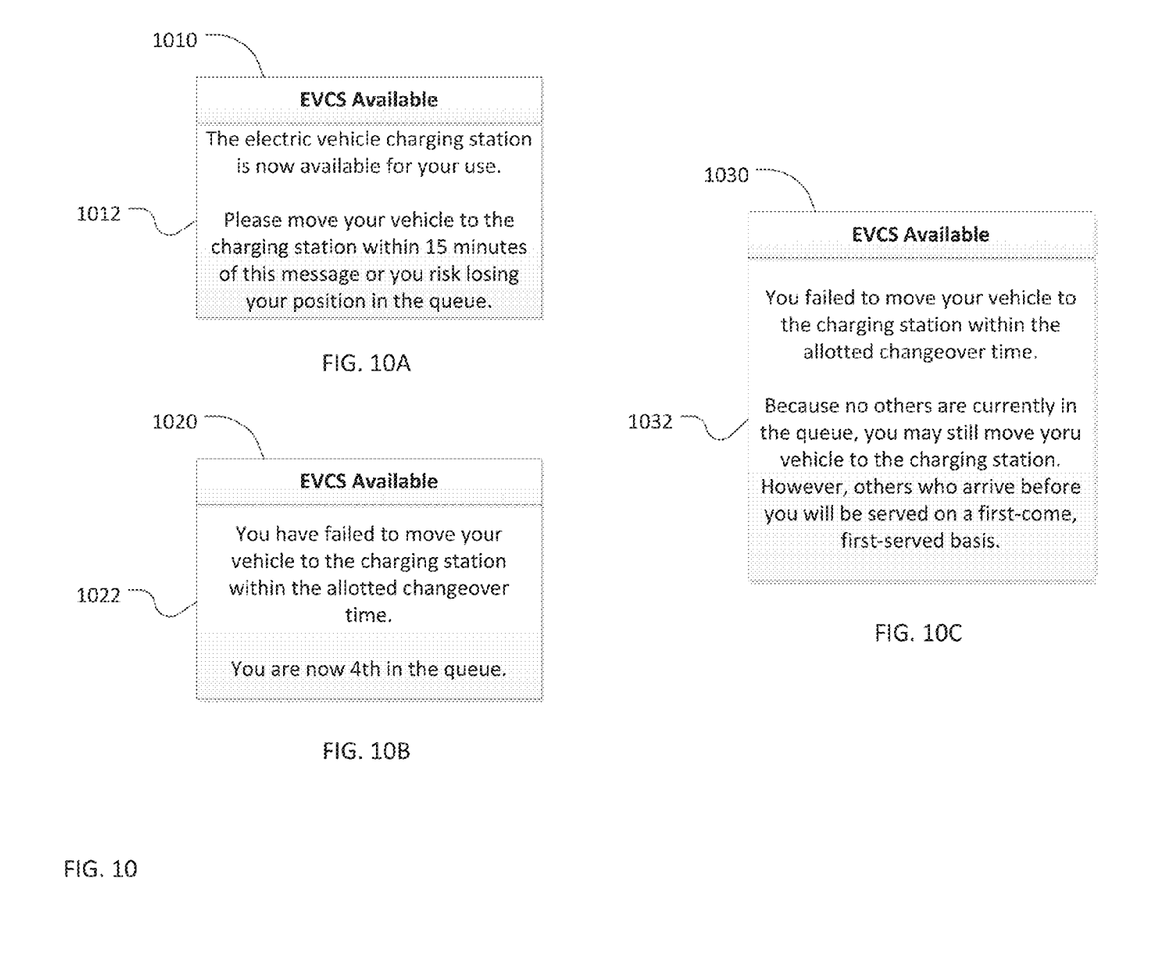
FIGS. 10A, 10B and 10C are examples of electric vehicle charging station availability notifications.

Once the driver has removed the current vehicle from the EVCS or, in some cases, simultaneously with the driver's notification to remove the current vehicle from the EVCS; the driver at the top of the queue will be notified to move his or her PEV to the EVCS at 730. An example of this notification 1010 and the associated information 1012 may be seen in FIG. 10A.

Once the driver has received the notification to move to the EVCS, access to the EVCS is limited for a changeover time at 740. During this changeover time, drivers other than the notified driver may not use the EVCS. A notification may be provided to other drivers, for example, on a display on the EVCS, to indicate that the EVCS is unavailable.

This changeover time may be predetermined. For example, a user may be given 15 minutes to move his or her PEV to the EVCS. Alternatively, the changeover time may be dynamic, generated based upon evaluation of various changeover parameters. For example, a function may be applied to various changeover parameters to, thereby, derive a changeover time. In one example, if the driver that has been notified to move his or her PEV to the EVCS is currently distant from the EVCS, but has priority over other drivers in the queue, then the changeover time may be generated based upon the time necessary to move the PEV to the EVCS.

These changeover parameters may include a time at which each of a plurality of requests in the queue was entered into the queue. The changeover parameters may include a listing of pre-determined priority drivers that are to be given priority in the queue over other drivers. The changeover parameters may also include prepayment by the driver or a membership, for example in a group that has priority access to the EVCS, of the driver.

The changeover parameters may also include the employment status of the driver, for example, the driver may be employed by the operator of the EVCS or the driver's employer may have contracted for priority access to the EVCS. The changeover parameters may also include the current location of the electric vehicle relative to the electric vehicle charging station or a willingness of the driver to pay a premium for priority in the queue.

The changeover parameters may also include data derived from communication with the PEV or with a PCD associated with the driver or PEV. For example, the current charge state for the electric vehicle or an estimate of the range of the PEV at the current charge state may be used to derive a changeover time. Similarly, an estimate of the time to full charge or an estimate of a length of time necessary to reach a pre-determined charge state may be used to derive a changeover time.

However determined, the limited access to the EVCS during the changeover time may be imposed in a number of ways. The EVCS may not work until interaction by the driver at the top of the queue. For example, the driver at the top of the queue may be required to bring a Bluetooth-enabled mobile device within a few feet of the EVCS. Alternatively, the driver at the top of the queue may be required to bring a radio frequency identification tag within a few inches of the EVCS. The driver at the top of the queue may insert a credit card associated with the user into a receptacle on or near the EVCS. The driver at the top of the queue may use a scanner at the EVCS to scan a barcode on his or her mobile device. Similarly, the driver at the top of the queue may input a username, user ID and/or passcode to enable the EVCS.

The EVCS may not operate to charge a driver's vehicle (other than the driver at the top of the queue) during the changeover time. The EVCS may display an indication that the EVCS is reserved during the changeover time to alert other potential users to the EVCS' unavailability. The EVCS may be enabled once the driver at the top of the queue has arrived and has paid a fee or it has been confirmed that the driver at the top of the queue has a payment plan in place or has an associated account that enables automatic billing for EVCS use.

Next, a determination whether the driver at the top of the queue has moved his or her electric vehicle to and has begun using the EVCS before the end of the changeover time is made at 745. If the driver at the top of the queue has done so, then the associated PEV will be charged in the EVCS at 750. Once complete at 710, the process will continue at 720.

If the driver has not begun using the EVCS at 745, then a determination is made as to whether there are more potential drivers in the queue at 755. If there are not more drivers in the queue, then the driver at the top of the queue is notified that the EVCS is still available for his or her use, but that it is no longer reserved solely for his or her use at 760. An example of such a notification 1030 and associated information 1032 provided to the driver at the top of the queue appears in FIG. 10C.

Then, the changeover time limitations are removed and access to the EVCS is enabled for everyone at 770. At this point, the EVCS is available for use by anyone on a first-come, first-served, basis. The driver at the top of queue may still utilize the EVCS if he or she arrives before it is being used by any another person. Likewise, any other person may begin using the EVCS forcing any subsequent users, including the prior driver at the top of the queue, to join a queue and wait for access to the EVCS.

If there are more in the queue at 755, then the driver at the top of the queue is notified of his or her failure to move an electric vehicle to the EVCS at 780. Specifically, the driver at the top of the queue who has failed to arrive during the changeover time is notified that the EVCS is now being reserved for the next in queue. An example of such notification 1020 including information 1022 may be seen in FIG. 10B.

Next, the driver at the top of the queue is moved to the bottom of the queue at 790. Alternatively, the driver at the top of the queue may be moved to a different position in the queue, for example, if the current driver at the top of the queue is a VIP or an employee, the driver at the top of the queue may not be moved completely down the queue and may still have priority access to the EVCS over an average driver or typical EVCS driver.

The next driver in the queue (now the new driver at the top of the queue) is notified that the EVCS is available for his or her use at 780. An example of this notification 1010 and associated information 1012 may be seen in FIG. 10A.

Figure 8:
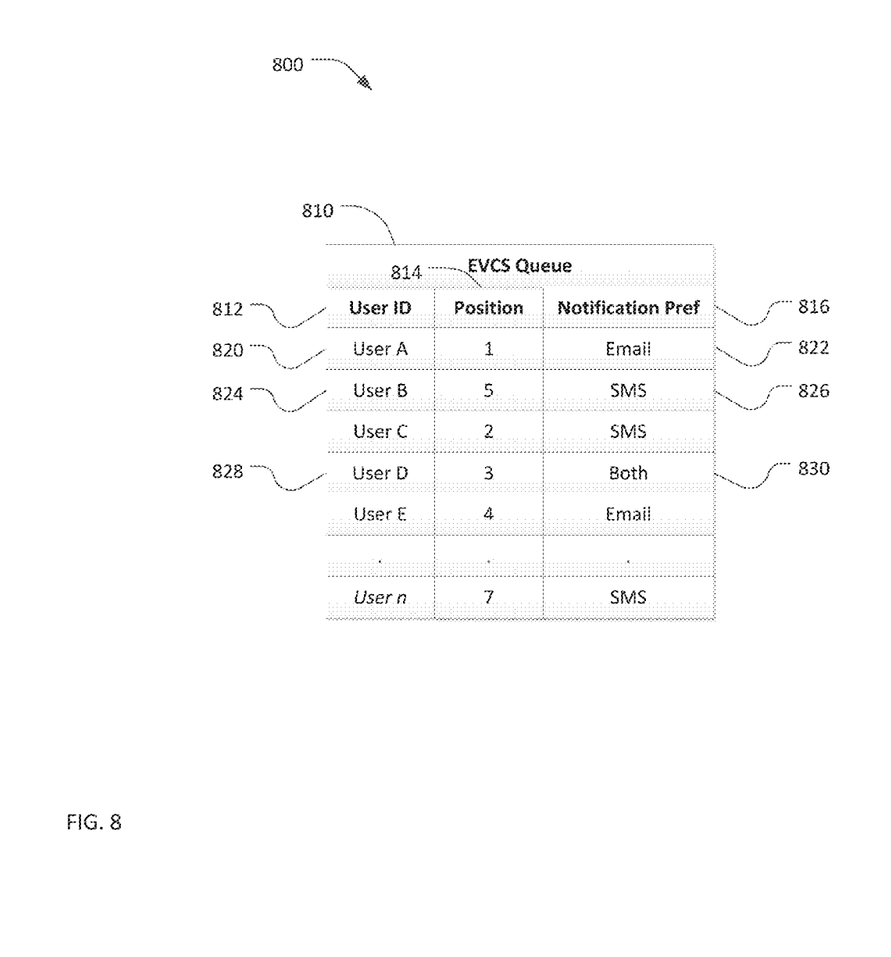
FIG. 8 is an example queue.

Referring now to FIG. 8, an example queue 800 is shown in table 810. The User ID 812, position 814 and notification preferences 816 are shown in table 810. The user notification preferences 816 indicate how a particular user (driver) would prefer to be contacted regarding their status in the queue—particularly when he or she is top of the queue. User A 820 has chosen to be contacted via email 822. User B 824 has chosen to be contacted via SMS (simple message service) 826. User D 828 has chosen to be contacted, simultaneously via both 830.

Though only SMS and email are provided as options here, other methods may also be employed, such as notifications in a dedicated mobile application may "pop up" on a particular user's smartphone. Alternatively, a telephone call may be placed to a mobile or other telephone number associated with a particular user, the telephone call providing an automated voice message notification.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of management for electric vehicle charging station queues comprising:
    maintaining a plurality of requests to utilize the electric vehicle charging station in a queue defining an order of electric vehicles to be charged at the electric vehicle charging station;
    notifying a vehicle operator that the vehicle operator has reached the top of the queue; and
    limiting access to the electric vehicle charging station during a changeover time after a prior electric vehicle has left the electric vehicle charging station to enable the vehicle operator to connect an electric vehicle to the electric vehicle charging station; and
    enabling access to the electric vehicle charging station, once the changeover time has elapsed and the electric vehicle has not been connected to the electric vehicle charging station, to one of: (a) anyone, if the queue is empty other than the vehicle operator and (b) a next driver in the queue, if there are other vehicle operators in the queue.

2. The method of claim 1 wherein the changeover time is a predetermined period of time.

3. The method of claim 1 wherein the changeover time is function-based such that changeover parameters are evaluated in deriving a changeover time.

4. The method of claim 3 wherein the changeover parameters include at least one of (1) a time at which each of the plurality of requests was entered, (2) a listing of pre-determined priority individuals, (3) a prepayment by the vehicle operator, (4) a membership of the vehicle operator, (5) an employment status of the vehicle operator, (6) a current location of the electric vehicle relative to the electric vehicle charging station, and (7) a willingness of the vehicle operator to pay a premium for priority in the queue.

5. The method of claim 1 wherein the changeover parameters further include vehicle data obtained from communication with the electric vehicle.

6. The method of claim 5 wherein the vehicle data includes at least one of (1) a current charge state for the electric vehicle, (2) an estimate of the range of the electric vehicle at the current charge state, (3) an estimate of the time to full charge, and (4) an estimate of a length of time necessary to reach a pre-determined charge state.

7. The method of claim 1 wherein the vehicle operator is notified using one of (1) a mobile telephone operated by the vehicle operator and (2) the electric vehicle.

8. The method of claim 1 wherein, when the queue is empty once the changeover time has elapsed and the electric vehicle has not been connected to the electric vehicle charging station and, the vehicle operator is notified that the electric vehicle charging station is still available, but will not be reserved for use by the vehicle operator.

9. The method of claim 8 wherein, when the queue is not empty once the changeover time has elapsed and the electric vehicle has not been connected to the electric vehicle charging station, the vehicle operator is placed at the end of the queue.

10. An electric vehicle charging station queue management system comprising:
    a communications system for:
        receiving requests for use of an electric vehicle charging station, and
        notifying a vehicle operator of operator that the vehicle operator has reached the top of the queue;
    a computing device for:
        accepting the requests and storing them in a queue defining an order of electric vehicles to be charged at an electric vehicle charging station;
        limiting access to the electric vehicle charging station during a changeover time after a prior electric vehicle has left the electric vehicle charging station to enable the vehicle operator to connect an electric vehicle to the electric vehicle charging station, and
        enabling access to the electric vehicle charging station, once the changeover time has elapsed and the electric vehicle has not been connected to the electric vehicle charging station, to one of: (a) anyone, if the queue is empty other than the vehicle operator and (b) a next driver in the queue, if there are other vehicle operators in the queue.

11. The electric vehicle charging station queue management system of claim 10 wherein the changeover time is a predetermined period of time.

12. The electric vehicle charging station reservation system of claim 10 wherein the changeover time is function-based such that changeover parameters are evaluated in deriving a changeover time.

13. The electric vehicle charging station queue management system of claim 12 wherein the changeover parameters include at least one of (1) a time at which each of the plurality of requests was entered, (2) a listing of pre-determined priority individuals, (3) a prepayment by the vehicle operator, (4) a membership of the vehicle operator, (5) an employment status of the vehicle operator, (6) a current location of the electric vehicle relative to the electric vehicle charging station, and (7) a willingness of the vehicle operator to pay a premium for priority in the queue.

14. The electric vehicle charging station queue management system of claim 11 wherein the changeover parameters further include vehicle data obtained from communication with the electric vehicle.

15. The electric vehicle charging station queue management system of claim 14 wherein the vehicle data includes at least one of (1) a current charge state for the electric vehicle, (2) an estimate of the range of the electric vehicle at the current charge state, (3) an estimate of the time to full charge, and (4) an estimate of a length of time necessary to reach a pre-determined charge state.

16. The electric vehicle charging station queue management system of claim 11 wherein the vehicle operator is notified using one of (1) a mobile telephone operated by the vehicle operator and (2) the electric vehicle.

17. The electric vehicle charging station queue management system of claim 11 wherein, when the queue is empty once the changeover time has elapsed and the electric vehicle has not been connected to the electric vehicle charging station, the vehicle operator is notified that the electric vehicle charging station is still available, but will not be reserved for use by the vehicle operator.

18. The electric vehicle charging station queue management system of claim 17 wherein, when the queue is not empty once the changeover time has elapsed and the electric vehicle has not been connected to the electric vehicle charging station, the vehicle operator is placed at the end of the queue.

* * * * *